(12) United States Patent
Haewoong

(10) Patent No.: US 6,971,709 B2
(45) Date of Patent: Dec. 6, 2005

(54) REAR SIDE SECTION STRUCTURE OF VEHICLE

(75) Inventor: Kim Haewoong, Gwangmyeong (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 10/883,179

(22) Filed: Jul. 1, 2004

(65) Prior Publication Data
US 2005/0088017 A1 Apr. 28, 2005

(30) Foreign Application Priority Data
Oct. 24, 2003 (KR) ............. 10-2003-0074648

(51) Int. Cl.[7] .................................. B60J 7/00
(52) U.S. Cl. ............ 296/203.04; 296/204; 296/203.02
(58) Field of Search ............. 296/203.04, 204, 296/193.07

(56) References Cited

U.S. PATENT DOCUMENTS

| | | | | |
|---|---|---|---|---|
| 2,012,057 A | * | 8/1935 | Swallow | 296/209 |
| 5,031,958 A | * | 7/1991 | Fujita et al. | 296/203.02 |
| 5,180,206 A | * | 1/1993 | Toyoda | 296/203.04 |
| 5,480,208 A | * | 1/1996 | Cobes et al. | 296/204 |
| 5,700,049 A | * | 12/1997 | Shibata | 296/203.03 |
| 5,992,921 A | * | 11/1999 | Seki | 296/204 |
| 6,113,180 A | * | 9/2000 | Corporon et al. | 296/203.04 |
| 6,234,568 B1 | * | 5/2001 | Aoki | 296/203.04 |
| 6,616,220 B2 | * | 9/2003 | Cheong | 296/203.04 |
| 6,676,200 B1 | * | 1/2004 | Peng | 296/204 |
| 6,824,200 B2 | * | 11/2004 | Tomita | 296/193.07 |
| 6,908,146 B2 | * | 6/2005 | Tomita | 296/203.02 |
| 2002/0149234 A1 | * | 10/2002 | Cheong | 296/203.04 |

* cited by examiner

Primary Examiner—Kiran B. Patel
(74) Attorney, Agent, or Firm—Morgan Lewis & Bockius LLP

(57) ABSTRACT

Safety of a vehicle is improved by employing a rear side member in a generally straight line shape in parallel with a side sill. Connecting and combining overlapped areas between the side sill and the rear side member with multiple closed cross-section structures provides even stronger support against an impact delivered from behind a vehicle. Furthermore, the structure effectively disperses the delivered impact.

7 Claims, 5 Drawing Sheets

US 6,971,709 B2

REAR SIDE SECTION STRUCTURE OF VEHICLE

CROSS REFERENCE TO RELATED APPLICATIONS

This application claims priority of Korean Application No. 10-2003-0074648, filed Oct. 24, 2003, the disclosure of which is incorporated herein by reference.

TECHNICAL FIELD OF THE INVENTION

The present invention relates to a structure for the rear side section of a vehicle. More particularly, the structure minimizes deformation of the vehicle by providing stronger support against an impact delivered from behind the vehicle and disperses the delivered impact effectively.

BACKGROUND OF THE INVENTION

Typically, the rear side member is a major support member for supporting an impact delivered from behind the vehicle. The rear side member is installed at a rear side section of the vehicle with its front portion connected to a side sill. The space required to install a wheel is needed in the rear side section, therefore, the rear side member is installed inside the wheel housing in a lengthwise direction. The front side of the rear side member is connected to the side sill in such a way that it is bent toward an outside of the vehicle.

However, if a part of the rear side member is bent as describe above it becomes difficult to effectively support an impact delivered from behind the vehicle because the bent part is easily deformed by the impact.

SUMMARY OF THE INVENTION

According to a preferred embodiment, a structure of a rear side section of a vehicle is provided that improves safety of the vehicle by providing increased support against an impact delivered from behind the vehicle. The structure also disperses the impact effectively.

According to an embodiment, the structure of the rear side section includes a rear side member that is generally straight line shaped along a lengthwise direction of the vehicle and is installed substantially in parallel with a side sill. A front reinforcing plate and a rear reinforcing plate connect the rear side member and side sill at an overlapped area between the rear side member and the side sill at the front and rear of the vehicle. A floor panel is connected with an upper part of the rear side member and the side sill, thus forming a closed cross-sections with the front reinforcing plate and the rear reinforcing plate.

BRIEF EXPLANATION OF THE DRAWINGS

For better understanding of the nature and objects of the invention, reference should be made to the following detailed description, taken in conjunction with the accompanying drawings, in which.

DETAILED EXPLANATION OF PREFERRED EMBODIMENTS

Figure 1:
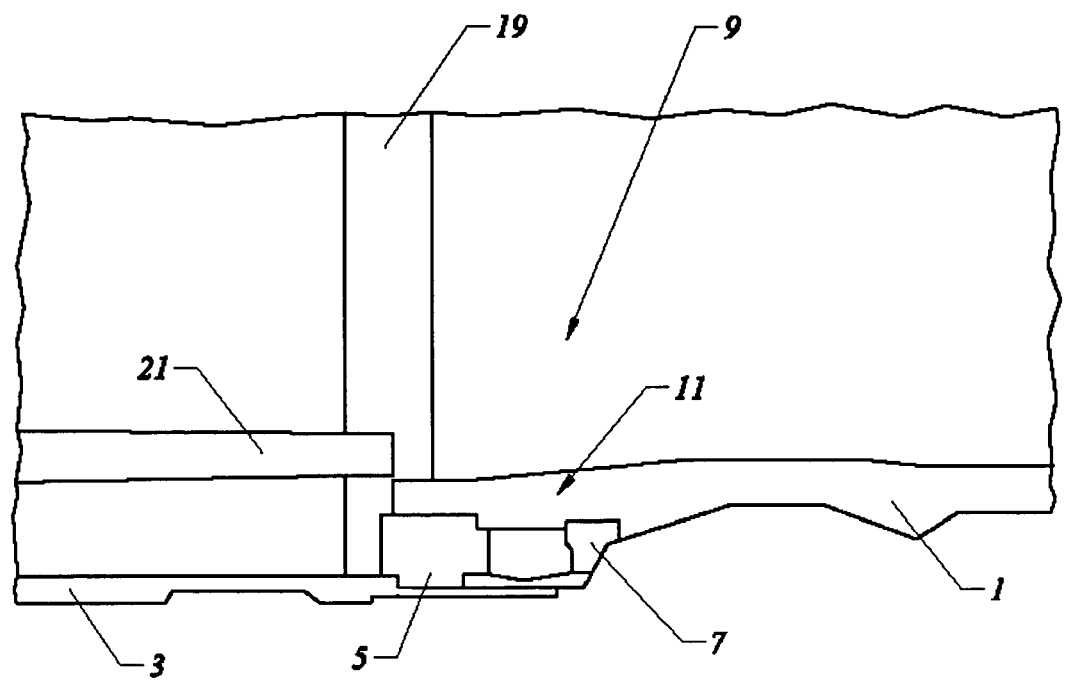
FIG. 1 is a plane view of a structure of a rear side section of a vehicle according to an embodiment of the present invention.
Figure 2:
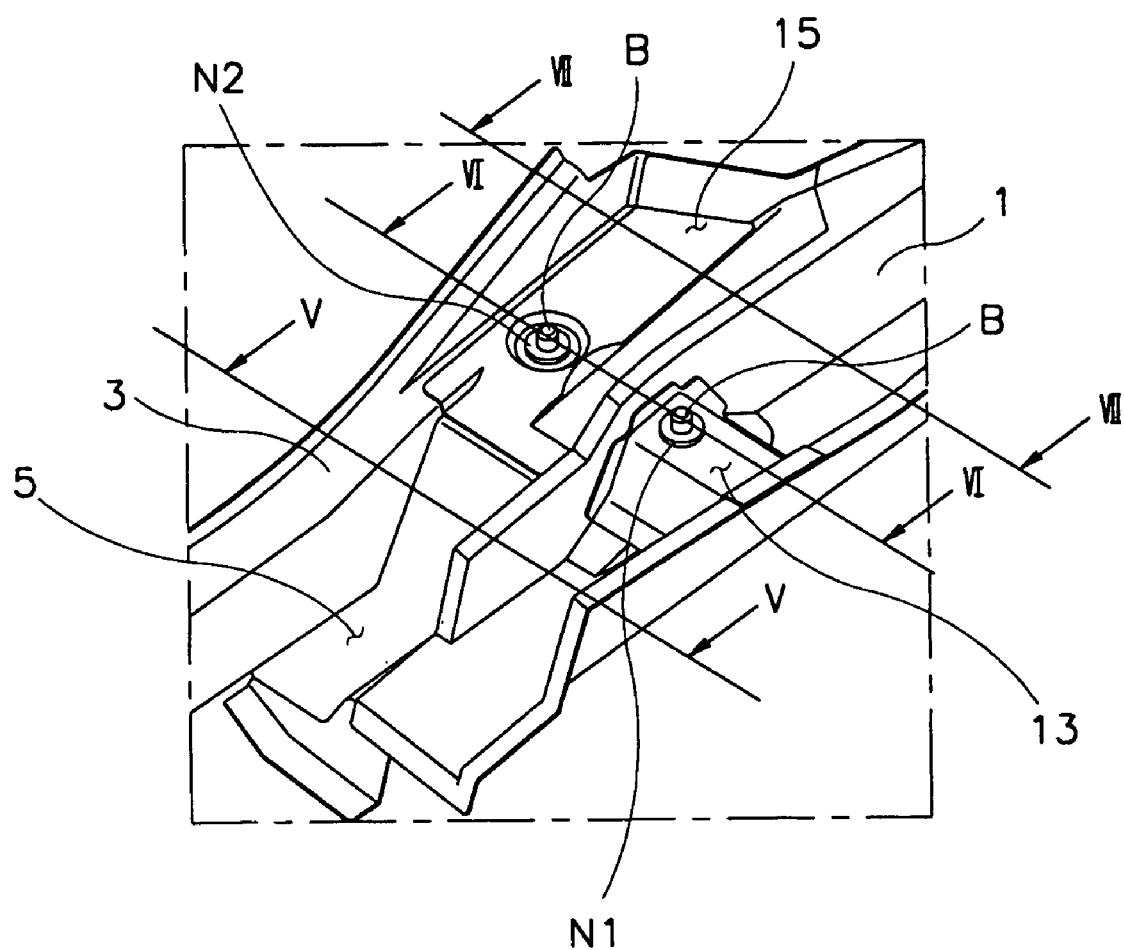
FIG. 2 is a perspective view of a connecting part between a rear side member and a side sill with the floor panel removed according to an embodiment of the present invention.
Figure 3:
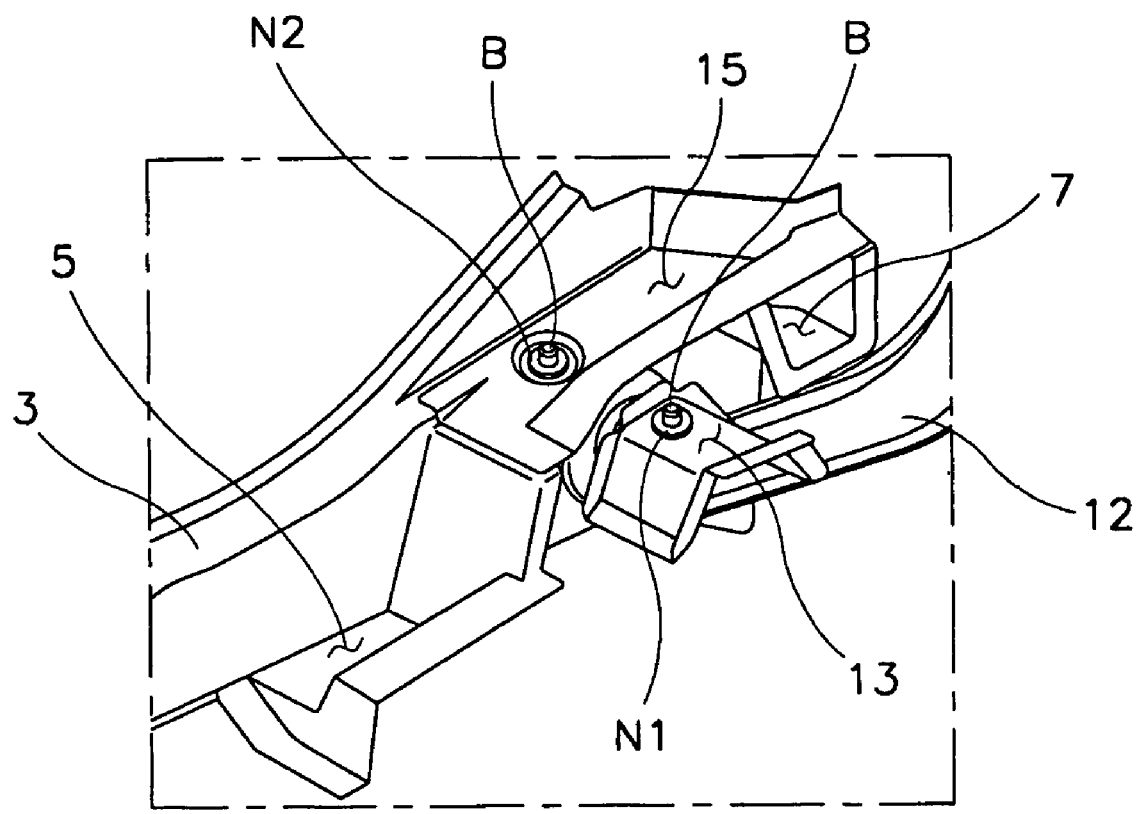
FIG. 3 is a perspective view similar to FIG. 2 but without the rear side member according to an embodiment of the present invention.

Referring to FIG. 1, a generally straight line shaped rear side member 1 is installed at a rear side section of a vehicle. The rear side member 1 is placed at least approximately in parallel with a side sill 3. To provide space to accommodate a rear wheel, the rear side member 1 is installed more toward an inside of the vehicle than the side sill 3. However, the configuration of the rear side member 1 is generally straight line shaped so the rear side member 1 and the side sill 3 are placed substantially in parallel and are spaced apart from each other sideways. It will be appreciated by one of ordinary skill in the art that the statement that the rear side member 1 is straight line shaped means that on a plane drawing viewed from above, the virtual lines connecting both ends, deciding the width of the rear side members 1, do not meet or intersect each other over the length of the rear side member 1. In other words, even though the rear side member 1 is not a complete straight line in appearance, a substantial portion of the width of the rear side member 1 forms a straight line, therefore the terminology nearly straight line shape applies to the substantial portion of the width.

Referring now to FIGS. 2–7, the structure of the section when the rear side member 1 and side sill 3 are combined will be discussed. The rear side member 1 and side sill 3 have a portion overlapping each other. On this overlapped area are provided the front reinforcing plate 5 and the rear reinforcing plate 7 that connect the rear side member 1 and side sill 3 at the front and rear of the vehicle. As the floor panels 9 are combined at the upper parts of the rear side member 1 and side sill 3, they form the closed cross-sections S1, S2 with the front reinforcing plate 5 and the rear reinforcing plate 7. In other words, an impact delivered through the rear side member 1 is properly supported by the side sill 3 by forming two closed cross-sections S1, S2 with the overlapped areas at the front and rear of the vehicle. The closed sections provide greater strength.

Thus, as described above, the rear side member 1 is connected to sill member 3 through three members: Flat reinforcing plate 5, rear reinforcing plate 7 and floor panels 9. Moreover, by providing a substantially straight rear side member as described, localized stress concentration in the rear side member is eliminated and impact forces can be transferred substantially equally to sill member 3 and center member 21. This substantially equal force transfer is facilitated by the rear side member joining the cross member 19 at a point approximately midway between the side sill member 3 and center member 21.

According to an alternate embodiment, the structure also provides a section for mounting a trailing arm. The trailing arm mounting section 11 is preferably provided between the front reinforcing plate 5 and the rear reinforcing plate 7. The trailing arm mounting section 11 is composed of the member side mounting reinforcing plate 13 installed on the rear side member 1 to divide horizontally a closed cross-section S3 between the rear side member 1 and the floor panel 9. A weld nut N1 is installed between the member side mounting reinforcing plate 13 and rear side member 1. The side sill side upper mounting reinforcing plate 15 forms the floor panel 9 and closed cross-section S4 by connecting the side sill 3 with the rear side member 1. The side sill side lower mounting reinforcing plate 17 forms a closed cross-section S5 along with the side sill 3 and sill side upper mounting reinforcing plate 15 by being joined these components to the lower part of the side sill side upper mounting reinforcing plate 15. Furthermore, a second weld nut N2 is installed between the sill side upper mounting reinforcing plate 15 and side sill side lower mounting reinforcing plate 17.

Figure 4:
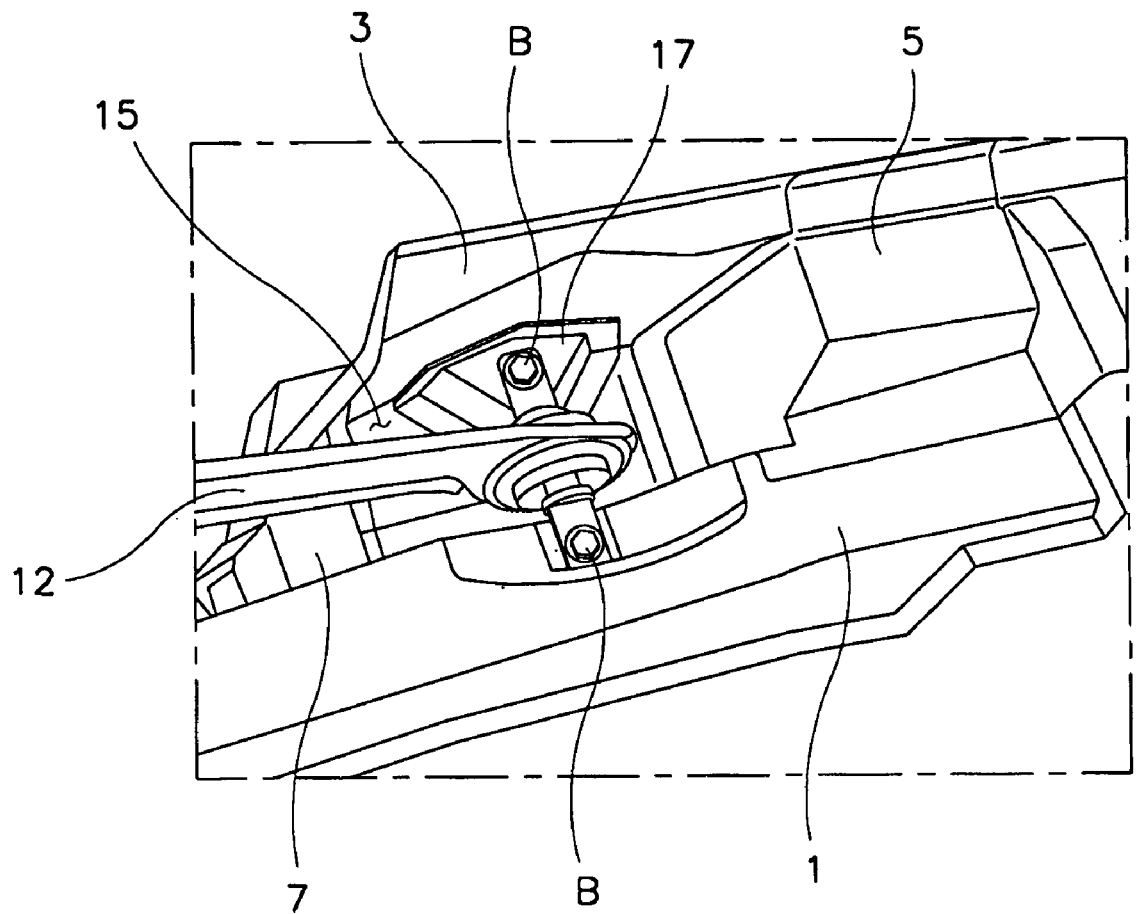
FIG. 4 is a perspective view from below illustrating the state that a trailing arm is combined according to an embodiment of the present invention.
Figure 5:
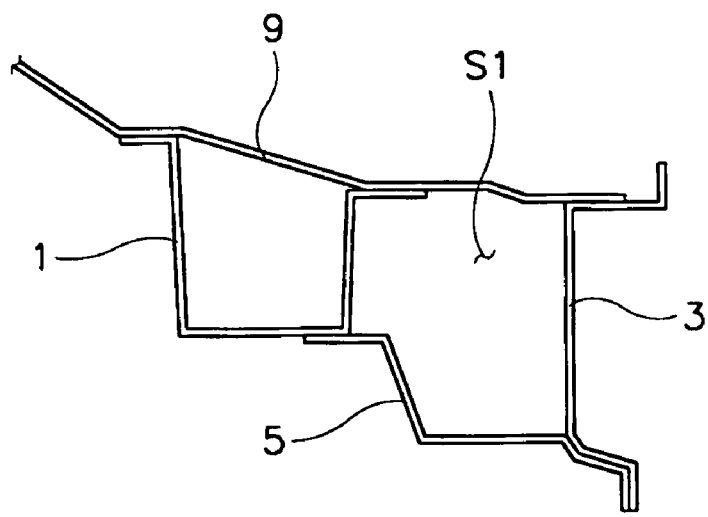
FIG. 5 is a cross-sectional view taken along the line V—V of FIG. 2.
Figure 6:
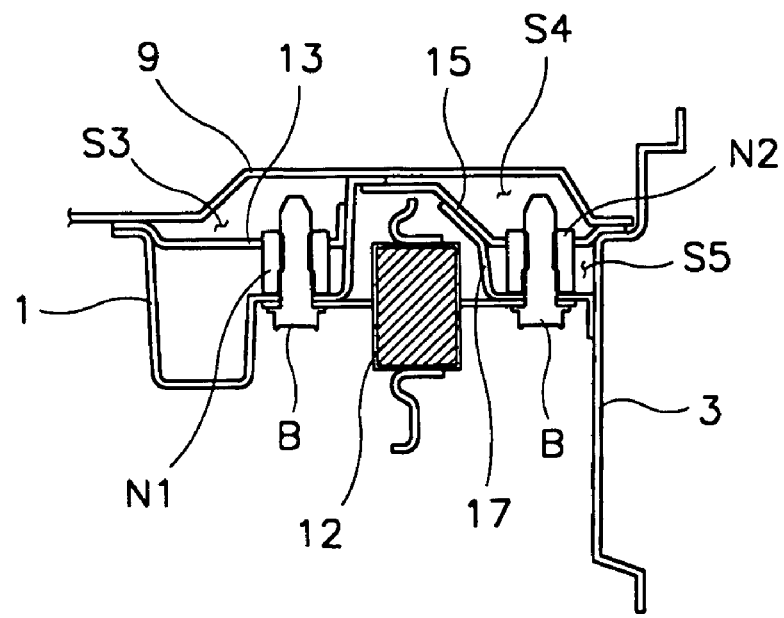
FIG. 6 is a cross-sectional view taken along the line VI—VI of FIG. 2.
Figure 7:
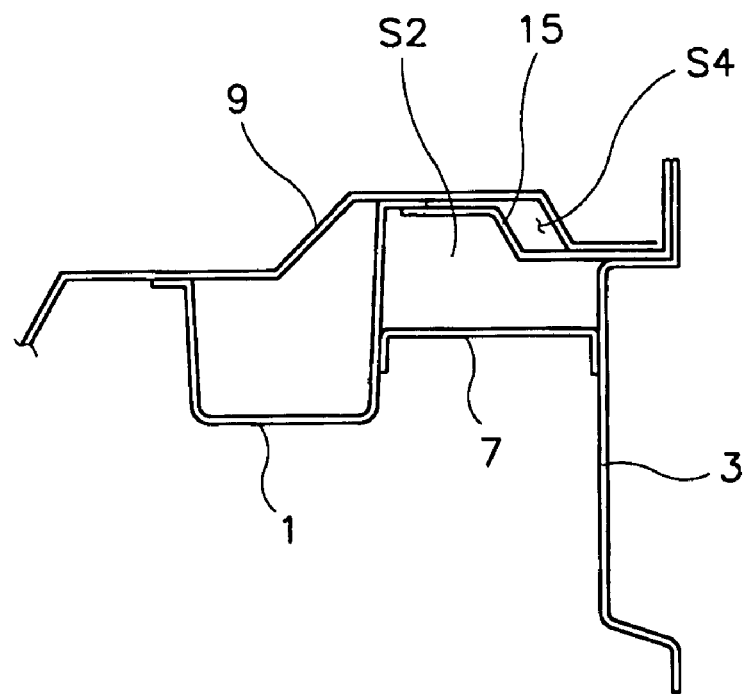
FIG. 7 is a cross-sectional view taken along the line VII—VII of FIG. 2.

Referring now to FIGS. 4 and 6, the trailing arm 12 is mounted on the lower part of the side sill 3 and rear side member 1 by a bolt B that is fastened by the weld nuts N1, N2. A closed cross-section S4 is formed by the sill side upper mounting reinforcing plate 15 and the floor panel 9. The closed cross-section S4 is formed inside the closed cross-section S2 formed by the rear reinforcing plate 7, as shown in FIG. 7. Therefore, the combination of the side sill 3 and the rear side member 1 is strengthened. With the structure of the rear side section of the vehicle described as above, the impact delivered from behind the vehicle in the case of a rear-end collision is supported by the rear side member 1 and side sill 3 so deformation of the rear part of the vehicle is minimized and the occupant safety is optimized.

According to an embodiment, an impact delivered to the rear side member 1 is effectively supported through the side sill 3 and rear side member 1 being nearly integrated into one unit. The nearly integrated one unit being formed by the closed cross-section S1 formed by the front reinforcing plate 5, the floor panel 9, rear side member 1, and the side sill 3. Wherein the closed cross-section S2 is formed by the rear reinforcing plate 7, the floor panel 9, rear side member 1, and the side sill 3.

The combined strength of the rear side member 1 and side sill 3 increases further as the trailing arm mounting section 11 is incorporated. The trailing arm mounting section 11 provides yet other closed cross-sections S3, S4, S5 between the closed cross-section S1 and the closed cross-section S2 formed by the rear reinforcing plate 7. On the other hand, an impact delivered to the rear side member 1 also dispersed to the center member 21. The center member is installed to secure the back and forth stiffness of a vehicle at the middle section of the floor, through the center member 19 installed sideways in the vehicle on the overlapped area in addition to the side sill 3.

The overlapped area also provides firm support against an impact delivered to a side of the vehicle through the structure of the closed cross-section S1, the closed cross-section S2, and the closed cross-sections S3, S4, S5 formed by the trailing arm mounting section 11.

Safety of a vehicle is improved by employing a rear side member in a nearly straight line shape in parallel with a side sill, connecting and combining overlapped areas between the side sill and the rear side member with multiple closed cross-section structures, thus providing more support against an impact delivered from behind the vehicle and dispersing the impact.

What is claimed is:

1. A structure of a rear side section of a vehicle, comprising:
    a rear side member having a substantially straight line shape along a lengthwise direction of a vehicle and being installed substantially in parallel with a side sill;
    a front reinforcing plate and a rear reinforcing plate connecting said rear side member and said side sill at an overlapped area between said rear side member and said side sill at a front and a rear of the vehicle; and
    a floor panel connected with an upper part of said rear side member and said side sill, wherein said floor panel forms a closed cross-section with said front reinforcing plate and said rear reinforcing plate.

2. The structure of claim 1, further comprising a trailing arm mounting section provided between said front reinforcing plate and said rear reinforcing plate.

3. The structure of claim 2, further comprising:
    a rotation axis mounting section including a member side mounting reinforcing plate installed on said rear side member to divide horizontally a closed cross-section between said rear side member and said floor panel;
    a weld nut installed between said member side mounting reinforcing plate and said rear side member;
    a side sill side upper mounting reinforcing plate forming the floor panel and a closed cross-section by connecting said side sill with said rear side member;
    a side sill side lower mounting reinforcing plate forming a closed cross-section along with said side sill and said side sill side upper mounting reinforcing plate by being joined with a lower part of said side sill side upper mounting reinforcing plate; and
    a weld nut installed between said side sill side upper mounting reinforcing plate and said side sill side lower mounting reinforcing plate.

4. A structure of a rear side section of a vehicle, comprising:
    a rear side member having a structurally rigid substantially linear shape oriented along a lengthwise direction of a vehicle, wherein said rear side member is installed substantially parallel to a side sill;
    a front reinforcing plate and a rear reinforcing plate overlappingly coupling said rear side member and said side sill at a front and a rear of the vehicle; and
    a floor panel coupled with an upper part of said rear side member and said side sill, wherein said floor panel forms a closed cross-section with said front reinforcing plate and said rear reinforcing plate.

5. The structure of claim 4, further comprising a trailing arm mounting section provided between said front reinforcing plate and said rear reinforcing plate.

6. The structure of claim 5, further comprising:
    a rotation axis mounting section including a member side mounting reinforcing plate coupled with said rear side member to horizontally divide a closed cross-section between said rear side member and said floor panel;
    a weld nut installed between said member side mounting reinforcing plate and said rear side member;
    a side sill side upper mounting reinforcing plate forming the floor panel and a closed cross-section by coupling said side sill with said rear side member;
    a side sill side lower mounting reinforcing plate forming a closed cross-section along with said side sill and said side sill side upper mounting reinforcing plate by coupling with a lower part of said side sill side upper mounting reinforcing plate; and a second weld nut installed between said side sill side upper mounting reinforcing plate and said side sill side lower mounting reinforcing plate.

7. The structure of claim 4, further comprising:

a cross member intersecting a forward end of the rear side member and a rear end of the side sill; and a center member extending forward from said cross member, wherein the rear side member joins the center member at a point at least approximately midway between the side sill and center member.

* * * * *